(12) United States Patent
Ory (10) Patent No.: US 10,583,740 B2
(45) Date of Patent: Mar. 10, 2020

(54) MULTIPURPOSE DASHBOARD FOR USE IN A VEHICLE

(71) Applicant: GM Global Technology Operations LLC, Detroit, MI (US)

(72) Inventor: Fabien Ory, Rüsselsheim (DE)

(73) Assignee: GM Global Technology Operations, LLC, Detroit, MI (US)

( * ) Notice: Subject to any disclaimer, the term of this patent is extended or adjusted under 35 U.S.C. 154(b) by 192 days.

(21) Appl. No.: 15/784,410

(22) Filed: Oct. 16, 2017

(65) Prior Publication Data
US 2019/0111785 A1  Apr. 18, 2019

(51) Int. Cl.
*B60K 37/06* (2006.01)
*B60N 3/00* (2006.01)
*B60N 2/14* (2006.01)

(52) U.S. Cl.
CPC ........... *B60K 37/06* (2013.01); *B60N 2/14* (2013.01); *B60N 3/001* (2013.01); *B60N 3/002* (2013.01); *B60K 2370/70* (2019.05)

(58) Field of Classification Search
CPC .......... B62D 1/181; B62D 1/183; B60N 2/14; B60N 3/002; B60N 3/001; B60K 37/06; B60K 2370/70; B60K 37/00
See application file for complete search history.

(56) References Cited

U.S. PATENT DOCUMENTS

| | | | | |
|---|---|---|---|---|
| 2,845,315 A * | 7/1958 | McCoy | ................. | B60N 3/002 108/33 |
| 2,862,328 A * | 12/1958 | Wadsworth | ............ | A47B 23/02 108/44 |
| 5,542,360 A * | 8/1996 | Fleming | ................. | A47B 23/04 108/23 |
| 5,560,676 A * | 10/1996 | Griffith | ................. | B60N 3/001 108/44 |
| 5,820,194 A * | 10/1998 | Slayter | ................... | B60N 3/001 296/70 |
| 6,135,546 A * | 10/2000 | Demtchouk | ........... | B60N 3/002 108/44 |
| 6,360,149 B1 * | 3/2002 | Kwon | .................... | B60K 35/00 701/41 |
| 6,382,745 B1 * | 5/2002 | Adkins | .................. | B60N 3/002 108/97 |

(Continued)

OTHER PUBLICATIONS

"Volvo shows what the interior of a self-driving car will be like," article, copyright 2005-2017, date captured Oct. 12, 2017, http://mashable.com/2015/11/18/volvo-concept-26/#0ycHONUzGPq3.

*Primary Examiner* — Paul N Dickson
*Assistant Examiner* — Timothy Wilhelm (57) ABSTRACT

A multipurpose dashboard for use in a vehicle includes an instrument panel disposed within the vehicle. The multipurpose dashboard also includes driving controls mounted to the instrument panel. The driving controls are configurable into a driving position for a user driving mode and configurable into a non-driving position for a non-driving mode. The non-driving position is disposed away from the driving position. The multipurpose dashboard also includes a workstation mounted to the instrument panel. The workstation is configurable into an accessible position during the non-driving mode and configurable into a stowed position during the user driving mode.

19 Claims, 4 Drawing Sheets

(56) References Cited

U.S. PATENT DOCUMENTS

| | | | | |
|---|---|---|---|---|
| 6,692,051 B1* | 2/2004 | Cook | | B60N 2/062 |
| | | | | 296/190.01 |
| 6,820,895 B2* | 11/2004 | Levine | | B60K 23/02 |
| | | | | 280/735 |
| 6,857,498 B2* | 2/2005 | Vitale | | B60K 37/00 |
| | | | | 180/326 |
| 7,293,507 B2* | 11/2007 | DePue | | B60N 3/002 |
| | | | | 108/152 |
| 7,303,226 B2* | 12/2007 | Bernstein | | B60N 2/14 |
| | | | | 296/190.01 |
| 7,363,131 B2* | 4/2008 | Howell | | B62D 1/18 |
| | | | | 701/41 |
| 7,474,204 B2* | 1/2009 | Songwe, Jr. | | B60K 35/00 |
| | | | | 340/461 |
| 7,494,170 B2* | 2/2009 | Hanzel | | B60R 11/00 |
| | | | | 296/37.12 |
| 7,641,252 B2* | 1/2010 | Sturt | | B60N 3/002 |
| | | | | 296/24.34 |
| 7,946,542 B1* | 5/2011 | Chapman | | B60R 11/0252 |
| | | | | 248/122.1 |
| 8,109,565 B2* | 2/2012 | Waters | | B60N 2/206 |
| | | | | 108/44 |
| 8,237,389 B2* | 8/2012 | Fitch | | B25J 13/06 |
| | | | | 180/271 |
| 8,342,450 B2* | 1/2013 | Funke | | B64D 11/06 |
| | | | | 244/118.6 |
| 8,714,093 B2* | 5/2014 | Rigner | | B60R 7/06 |
| | | | | 108/45 |
| 9,007,318 B2* | 4/2015 | Goldman-Shenhar | | |
| | | | | G06F 3/0488 |
| | | | | 345/173 |
| 9,150,164 B2* | 10/2015 | Mitchell | | B60R 11/0235 |
| 9,187,011 B2* | 11/2015 | Rouxel | | B60N 3/002 |
| 9,194,168 B1* | 11/2015 | Lu | | E05F 15/70 |
| 9,248,743 B2* | 2/2016 | Enthaler | | B60K 37/06 |
| 9,428,118 B1* | 8/2016 | Rawlinson | | B60R 11/0252 |
| 9,469,196 B2* | 10/2016 | Kim | | B62D 1/02 |
| 9,505,383 B2* | 11/2016 | Peel | | B60T 7/16 |
| 9,688,146 B2* | 6/2017 | Kim | | B60K 35/00 |
| 9,758,064 B1* | 9/2017 | Dry | | B60N 3/002 |
| 9,802,638 B1* | 10/2017 | Stoffel | | B62D 1/00 |
| 9,828,016 B2* | 11/2017 | Lubischer | | B60R 21/203 |
| 9,855,860 B2* | 1/2018 | Ahn | | B60N 2/01 |
| 9,896,011 B2* | 2/2018 | Kong | | B60N 3/002 |
| 9,925,903 B2* | 3/2018 | Christiansson | | B60N 3/001 |
| 9,960,800 B2* | 5/2018 | An | | H04B 1/3822 |
| 9,963,035 B2* | 5/2018 | El Aile | | B60R 21/203 |
| 10,017,087 B2* | 7/2018 | Dry | | B60N 3/004 |
| 10,023,091 B2* | 7/2018 | Bendewald | | B60N 3/001 |
| 10,023,124 B2* | 7/2018 | Schmidt | | B60R 5/02 |
| 10,086,732 B2* | 10/2018 | Welch | | B60N 3/002 |
| 10,146,357 B2* | 12/2018 | Bendewald | | B60W 50/14 |
| 10,300,825 B2* | 5/2019 | Akaike | | B60N 2/79 |
| 2002/0066392 A1* | 6/2002 | Calam | | B60R 11/0252 |
| | | | | 108/33 |
| 2002/0158448 A1* | 10/2002 | Okonkwo | | B60K 37/00 |
| | | | | 280/775 |
| 2005/0218681 A1* | 10/2005 | DePue | | B60N 3/002 |
| | | | | 296/37.12 |
| 2006/0197353 A1* | 9/2006 | Hanzel | | B60R 11/00 |
| | | | | 296/37.12 |
| 2009/0085368 A1* | 4/2009 | Coffelt | | B60K 35/00 |
| | | | | 296/70 |
| 2011/0156478 A1* | 6/2011 | Thorsell | | B60K 37/04 |
| | | | | 307/9.1 |
| 2013/0185662 A1* | 7/2013 | Quattrocolo | | B60K 37/06 |
| | | | | 715/764 |
| 2014/0252811 A1* | 9/2014 | Whalen | | B60N 3/002 |
| | | | | 297/144 |
| 2015/0343963 A1* | 12/2015 | Angeletti | | B60R 11/0241 |
| | | | | 296/37.12 |
| 2016/0121805 A1* | 5/2016 | Forsgren | | B60R 11/0235 |
| | | | | 348/837 |
| 2016/0266778 A1* | 9/2016 | Rawlinson | | B60K 35/00 |
| 2016/0347348 A1* | 12/2016 | Lubischer | | B62D 1/181 |
| 2016/0375924 A1* | 12/2016 | Bodtker | | B62D 1/046 |
| | | | | 74/552 |
| 2016/0375926 A1* | 12/2016 | Lubischer | | B62D 1/183 |
| | | | | 74/493 |
| 2016/0375927 A1* | 12/2016 | Schulz | | B62D 1/183 |
| | | | | 280/775 |
| 2017/0112274 A1* | 4/2017 | De Saulles | | B60N 3/002 |
| 2017/0212633 A1* | 7/2017 | You | | G06F 3/0412 |
| 2017/0293306 A1* | 10/2017 | Riefe | | B62D 1/02 |
| 2017/0297606 A1* | 10/2017 | Kim | | B62D 1/181 |
| 2017/0334452 A1* | 11/2017 | Abe | | B60W 10/04 |
| 2018/0079426 A1* | 3/2018 | Salter | | B60W 50/082 |
| 2018/0154932 A1* | 6/2018 | Rakouth | | B62D 5/091 |
| 2018/0272900 A1* | 9/2018 | Fitzpatrick | | B60N 3/001 |

* cited by examiner

MULTIPURPOSE DASHBOARD FOR USE IN A VEHICLE

The present disclosure relates to a multipurpose dashboard for use in a vehicle, and more particularly to a multipurpose dashboard having a driving configuration and a non-driving configuration.

Traditionally, motor vehicles include driver controls mounted to a dashboard or instrument panel in the interior area for controlling the vehicle. These driving controls include a steering wheel, accelerator pedal, brake pedal, etc. While operating a vehicle, the driver interacts with the driver controls and thus, by necessity, these driving controls are located within convenient access of the driver. Still, these driving controls occupy high-priority space around the driver and on the dashboard and can prevent the driver from moving comfortably and interacting with other items within the vehicle and dashboard for non-driving tasks. For example, in vehicles which make frequent stops such as delivery or cargo vehicles, the driving controls are not required to be in active use all the time and may interfere with non-driving tasks. Additionally, in a vehicle that has autonomous driving capability, the driver controls are not required to be in active use during all periods of vehicle operation. For all these reasons, there is a need for convenient in-vehicle access to a multipurpose dashboard configurable between a driving mode and a non-driving mode.

SUMMARY

According to several aspects of the present disclosure, a multipurpose dashboard is provided for use in a vehicle. The multipurpose dashboard includes an instrument panel disposed within the vehicle. The multipurpose dashboard also includes driving controls mounted to the instrument panel. The driving controls are configurable into a driving position for a user driving mode and configurable into a non-driving position for a non-driving mode. The non-driving position is disposed away from the driving position. The multipurpose dashboard also includes a workstation mounted to the instrument panel. The workstation is configurable into an accessible position during the non-driving mode and configurable into a stowed position during the user driving mode.

In an additional aspect of the present disclosure, the vehicle is controlled by a user during the user driving mode and the vehicle is controlled by a vehicle control system during the non-driving mode.

In an additional aspect of the present disclosure, the driving controls are disposed directly in front of a vehicle seat and accessible by the user in the vehicle seat when in the driving position.

In an additional aspect of the present disclosure, the driving controls are not accessible by the user in the vehicle seat when in the non-driving position.

In an additional aspect of the present disclosure, the driving controls are centered on the instrument panel when in the driving position.

In an additional aspect of the present disclosure, the driving controls are disposed to a side of the instrument panel when in the non-driving position.

In an additional aspect of the present disclosure, the instrument panel includes a member, the driving controls are mounted to the member, and the driving controls are configured to translate along the member between the driving position and the non-driving position.

In an additional aspect of the present disclosure, the driving controls include a steering member, an accelerator pedal, and a brake pedal.

In an additional aspect of the present disclosure, the workstation is stored in a space located above a wheel arch area of the vehicle when in the stowed position.

In an additional aspect of the present disclosure, the workstation is accessible to a user in a seat when in the accessible position.

In an additional aspect of the present disclosure, the workstation is rotatable and translatable from one configuration to another configuration when in the accessible position.

In an additional aspect of the present disclosure, the workstation includes an articulating arm operable to pivot from the stowed position into the accessible position.

In an additional aspect of the present disclosure, the articulating arm is connected to a pivot assembly that includes a ball detent spring mechanism to provide preset detent positions of the articulating arm.

In an additional aspect of the present disclosure, the articulating arm includes a front surface having an electronic user interface and a back surface, the front and back surfaces opposite one another, the articulating arm rotatable for access to the front surface and the back surface.

In an additional aspect of the present disclosure, the workstation includes a work surface extending from the instrument panel when in the accessible position and stored within the instrument panel when in the stowed position.

In an additional aspect of the present disclosure, the instrument panel at least partially surrounds a vehicle seat in the vehicle.

According to several aspects of the present disclosure, a multipurpose dashboard is provided for use in an autonomous vehicle. The multipurpose dashboard includes an instrument panel disposed within the autonomous vehicle. The multipurpose dashboard also includes driving controls mounted to the instrument panel, the driving controls configurable into a driving position for a user driving mode and configurable into a non-driving position for an autonomous driving mode. The driving controls are disposed directly in front of a vehicle seat and accessible by the user in the vehicle seat when in the driving position. The driving controls are not accessible by the user in the vehicle seat when in the non-driving position. The multipurpose dashboard also includes a workstation mounted to the instrument panel, the workstation configurable into an accessible position during the autonomous driving mode and configurable into a stowed position during the user driving mode. The workstation includes a work surface extending from the instrument panel when in the accessible position, the work surface stored within the instrument panel when in the stowed position.

According to several aspects of the present disclosure, a multipurpose dashboard is provided for use in an autonomous vehicle. The multipurpose dashboard includes an instrument panel disposed within the autonomous vehicle, the instrument panel at least partially surrounding a vehicle seat in the autonomous vehicle. The multipurpose dashboard also includes driving controls mounted to the instrument panel, the driving controls configurable into a driving position for a user driving mode and configurable into a non-driving position for an autonomous driving mode, the non-driving position being disposed away from the driving position. The multipurpose dashboard also includes a workstation mounted to the instrument panel, the workstation configurable into an accessible position during the autonomous driving mode and configurable into a stowed position housed within the instrument panel during the user driving mode, the workstation being rotatable and translatable from one configuration to another configuration and including a work surface extending from the instrument panel when in the accessible position, the work surface stored within the instrument panel in a space located above a wheel arch area of the autonomous vehicle when in the stowed position. The workstation further includes an articulating arm operable to pivot from the stowed position into the accessible position, the articulating arm connected to a pivot assembly that includes a ball detent spring mechanism to provide preset detent positions of the articulating arm, the articulating arm including a front surface having an electronic user interface and a back surface, the front and back surfaces opposite one another, the articulating arm rotatable for access to the front surface and the back surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
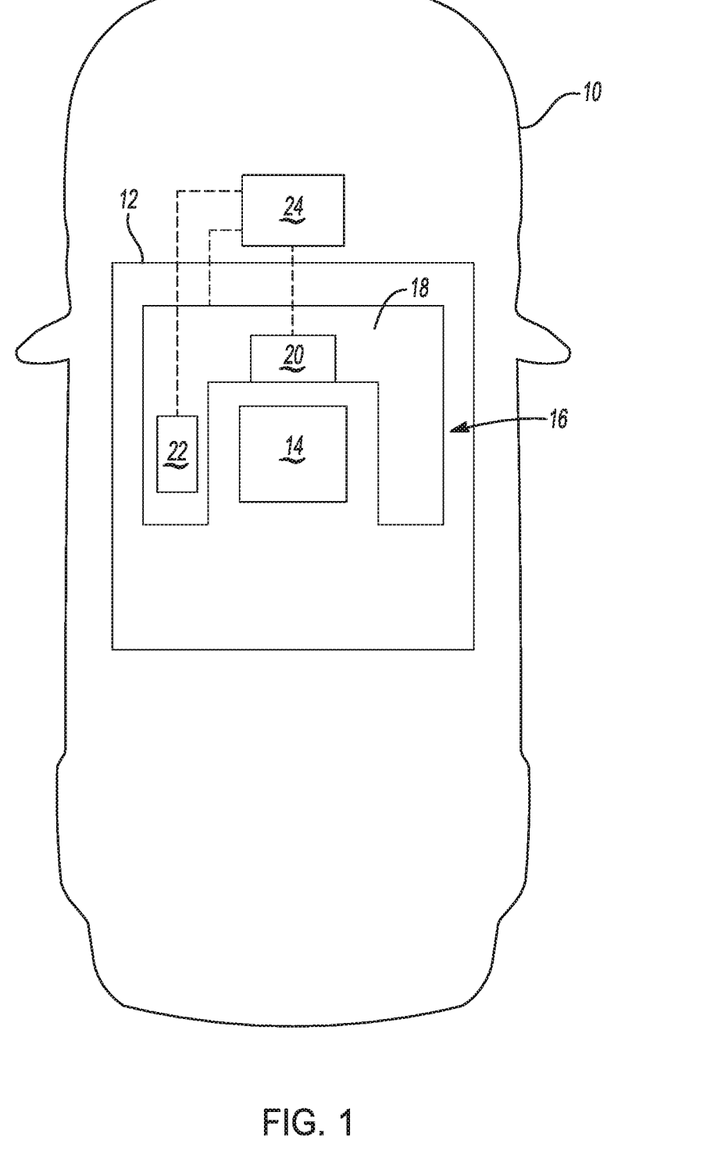
FIG. 1 is a schematic illustration of a vehicle according to an exemplary embodiment.

Referring now to the drawings, wherein like reference numbers correspond to like or similar components throughout the several figures, a vehicle 10 is shown schematically in FIG. 1. While the vehicle 10 is illustrated as a passenger car, it should be appreciated that the vehicle 10 may be any type of vehicle including a van, truck, motor home, etc. The vehicle 10 generally includes an interior, cabin, or cockpit 12. The interior cabin 12 defines an interior driving or work space within the vehicle 10 in which an operator of the vehicle may sit within a seat 14. While one seat 14 is illustrated, the vehicle 10 may have any number of seats 14 within the interior cabin 12. A multipurpose dashboard 16 is mounted within the interior cabin 12 proximate the seat 14. The multipurpose dashboard 16 generally includes an instrument panel 18 or dashboard 16 to which vehicle controls 20 and a workstation 22 are mounted. The instrument panel 18, vehicle controls 20, and optionally the workstation 22 are in electronic communication with a vehicle control system 24. The vehicle control system 24 includes one or more vehicle electronic control units or modules operable for management of various vehicle subsystems such as the engine, transmission, suspension, body, brakes, telematics, and other vehicle subsystems.

In an example, the vehicle 10 is an autonomous vehicle that is controlled by the vehicle control system 24 during an autonomous driving mode. It is to be understood that various levels of autonomy can be utilized in an autonomous vehicle. The Society of Automotive Engineers (SAE International) defines six levels of driving automation systems for performance of part or all of a dynamic driving task on a sustained basis that range from zero to five in SAE standard J3016_201609, titled "Taxonomy and Definitions for Terms Related to Driving Automation Systems for On-Road Motor Vehicles", published in a revised version on Sep. 30, 2016. In this example, when in the autonomous driving mode the vehicle control system 24 controls the vehicle 10 in a level 5 fully autonomous mode.

Figure 2:
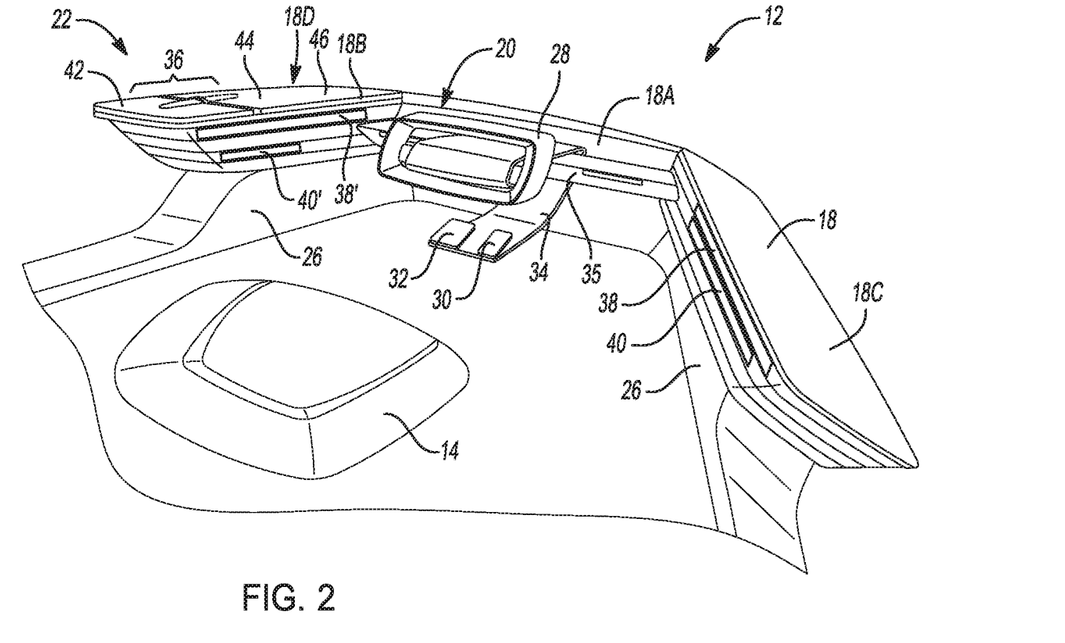
FIG. 2 is a perspective view of a portion of a vehicle interior including a multipurpose dashboard with driving controls in a driving position and a workstation in a stowed position according to an exemplary embodiment.

Referring to FIG. 2, the instrument panel 18 is mounted within the interior cabin 12 of the vehicle 10 adjacent forward wheel wells 26. The instrument panel 18 has a center portion 18A, a left portion 18B, and a right portion 18C. Thus, the instrument panel 18 is generally U-shaped and at least partially surrounds the seat 14. However, it should be appreciated that the instrument panel 18 may have other shapes without departing from the scope of the present disclosure. The instrument panel 18 may house instrument clusters, navigation or infotainment screens, climate controls, etc. In an example, the instrument cluster may reside primarily in the front area of the vehicle interior while articulation of various workstation elements located within the instrument cluster are operable to move into an operative configuration during a non-driving mode that may extend from the front of the vehicle interior toward the user. Therefore, the workstation elements are operable to extend to a position needed for a user to accomplish a desired task during a non-driving mode, regardless of whether the position at least partially surrounds the seat 14.

The driving controls (or vehicle controls) 20 are mounted to the instrument panel 18. The driving controls 20 include any set of vehicle controls that allow a user of the vehicle 10 to manually drive the vehicle 10. In the example provided, the driving controls 20 include a steering member 28, an accelerator pedal 30, and a brake pedal 32. In other examples, the driving controls 20 include features such as buttons or levers for cruise control, turn signals, windshield wipers, and other vehicle driving systems. The steering member 28, the accelerator pedal 30, and the brake pedal 32 are mounted to a driving controls housing 34. The driving controls housing 34 is slidably mounted on a cross member 35. The cross member 35 extends across the center portion 18A of the instrument panel 18 from the left side 18B to the right side 18C. The cross member 35 may form part of the instrument panel 18 and include storage and instrument controls and gauges, or be separate.

Figure 3:
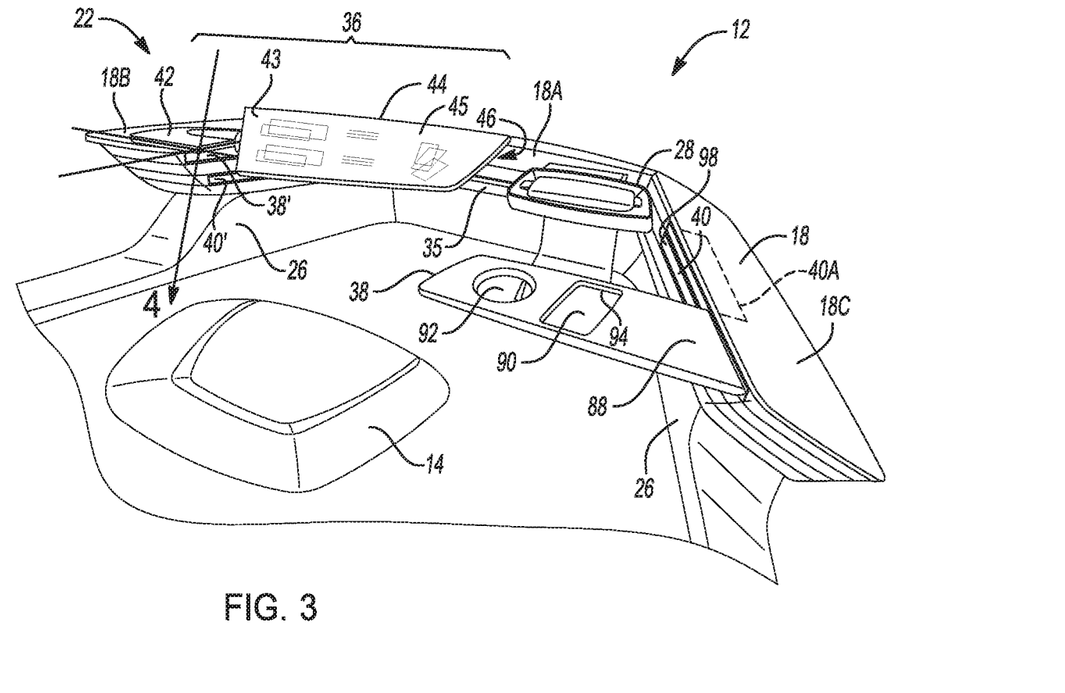
FIG. 3 is a perspective view of a vehicle interior including a multipurpose dashboard with driving controls in a non-driving position and a workstation in an accessible position according to an exemplary embodiment.

The driving controls 20 are configurable into a driving position for a user driving mode (shown in FIG. 2) and a non-driving position for a non-driving mode (shown in FIG.

3). In the driving position, the driving controls 20 are disposed directly in front of the seat 14 and are accessible by a user in the seat 14. In the example provided, driving controls 20 are centered on the instrument panel 18 when in the driving position. However, it should be appreciated that the driving controls 20 may be on a left side of the instrument panel 18 or a right side of the instrument panel 18 when in the driving position without departing from the scope of the present disclosure.

Referring to FIG. 3, the driving controls 20 are configurable into the non-driving position for the non-driving mode by translating along the cross member 35. The non-driving mode may be a mode where the vehicle is not moving, such as during delivery of cargo, while in park, and while idling, or where the vehicle in an autonomous driving mode where the vehicle control system 24 autonomously drives the vehicle. The driving controls 20 are functionally disabled for controlling the vehicle 10 when in the non-driving position. Generally, the non-driving position is disposed away from the driving position such that the area in front of the seat 14 is free of the driving controls 20. For example, the driving controls 20 are disposed adjacent the right portion 18C of the instrument panel 18 when in the non-driving position. In another example, the steering member 28 tilts and slides away from the seat 14 and towards the vehicle controls housing 34 to a stowed position when in the non-driving position.

The workstation 22 generally includes one or more features or devices mounted to the instrument panel 18 that allow a user to perform one or more non-driving tasks. The workstation 22 is generally configurable into an accessible position during the non-driving mode of the vehicle 10 and configurable into a stowed position during the user driving mode of the vehicle 10. In the accessible position, the workstation 22 is accessible to a user in the seat 14 and may occupy the space in which the driving controls 20 would be located when in the driving position. The workstation 22 is rotatable and translatable from one configuration to another configuration when in the accessible position. In the stowed position, the workstation 22 is housed within the instrument panel 18, made flush with the instrument panel 18, or otherwise made inaccessible to a user in the seat 14. In the example provided, the workstation 22 includes a first multifunction workstation 36, a second multifunction workstation 38, and a workstation storage element 40.

In examples, the first multifunction workstation 36 functions as an articulating arm operable to pivot from a stowed position into an accessible position. The first multifunction workstation 36 includes a base 42 and an arm or work panel 44. The base 42 is hinged to the left portion 18B of instrument panel 18 such that the base 42 rotates with respect to the instrument panel 18. The work panel 44 is hinged to the base 42 such that the work panel 44 rotates with respect to the base 42. The work panel 44 includes a first surface 45 opposite a second surface 46. The first surface 45 includes an electronic user interface. The electronic user interface provides features of an interactive touch screen display including various functionalities customizable to the purposes of a user during the non-driving mode. The second surface 46 includes a flat space to be used, for example, as a writing space, a space to place objects on, or to function as a protection for the electronic user interface when not in active use. When in the stowed position, the second surface 46 is substantially flush with the instrument panel 18 and cooperates with the instrument panel 18 to form a top surface 18D of the instrument panel 18.

Figure 4:
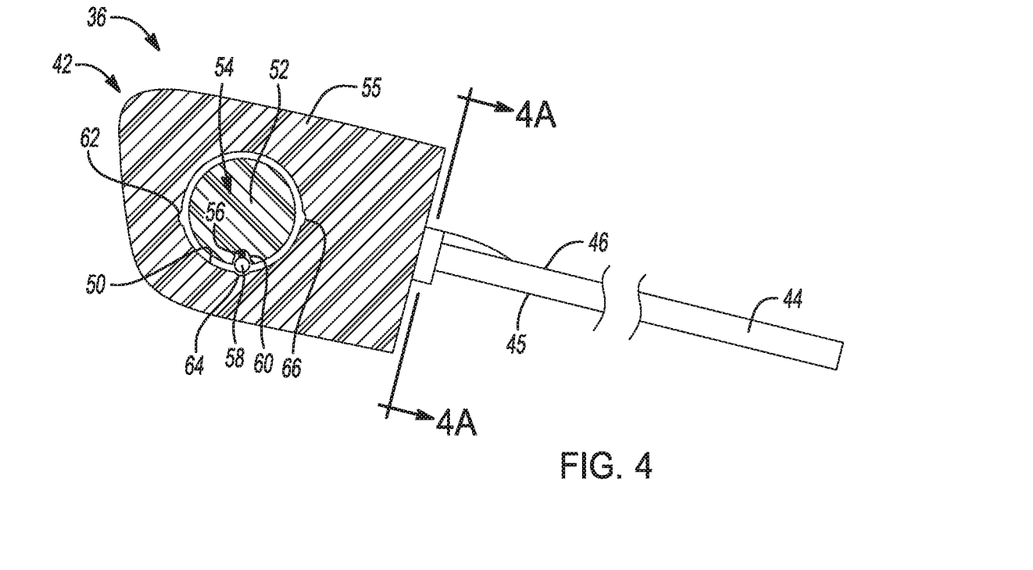
FIG. 4 is a top, partial cross-sectional view of a workstation component with three set point positions according to an exemplary embodiment.
Figure 4A:
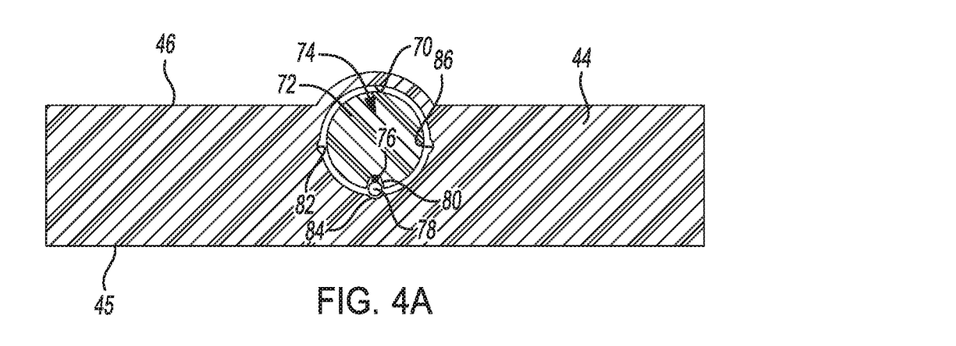
FIG. 4A is a side section view in the direction of arrow 4A-4A of the workstation component of FIG. 4 according to an exemplary embodiment.

Turning to FIGS. 4 and 4A, the base 42 includes a slot 50 that receives a post 52. The post 52 is fixedly connected to the instrument panel 18. The first multifunction workstation 36 includes a ball detent spring mechanism 54 to provide preset detent positions for articulation of the first multifunction workstation 36. The ball detent spring mechanism 54 includes a spring 56 to provide an outward force to a ball 58. The spring 56 is housed within a detent 60 formed on an exterior surface of the post 52. The ball 58 is biased into grooves 62, 64, 66 formed within the slot 50 of the base 42. Each of the grooves 62, 64, 66 corresponds to one of three pre-set rotation positions of the base 42. Other positions of the rotatable workstation component 50 are possible outside of the grooves 62, 64, 66. The ball detent spring mechanism 54 is used to adjust the base 42 into one or more fixed positions while intermediate positions are achieved depending on characteristics of the spring 56 and ball 58 used within the mechanism (e.g., the relative size/fit of ball 58 within the detent area and around the related component spaces in the environment of ball detent mechanism 54 including the size and stiffness of spring 56, etc.). In an example, forces within the ball detent spring mechanism 54 are enough to constrain the base 42 in place where a user has positioned it even outside of the grooves 62, 64, 66 at one or more positions within the full rotation potential of the base 42 and arm 44 of the first multifunction workstation 36.

Additionally, the arm 44 includes a slot 70 that receives a post 72. The post 72 is fixedly connected to the instrument panel base 42. The first multifunction workstation 36 includes a second ball detent spring mechanism 74 to provide preset detent positions for articulation of the first multifunction workstation 36. The ball detent spring mechanism 74 includes a spring 76 to provide an outward force to a ball 78. The spring 76 is housed within a detent 80 formed on an exterior surface of the post 72. The ball 78 is biased into grooves 82, 84, 86 formed within the slot 70 of the arm 44. Each of the grooves 82, 84, 86 corresponds to one of three pre-set rotation positions of the arm 44. Other positions of the rotatable workstation component 50 are possible outside of the grooves 82, 84, 86.

In examples, a mechanism such as the ball detent spring mechanism 54 allows a workstation component (e.g., the first multifunction workstation 36 or the work surface 38) to rotate front to back as indicated in FIGS. 4 and 4A with the arm 44. As such, the arm 44 is positionable at various angles relative to horizontal, including any particular position the user selects in addition to the one or more ball detent recesses for the unit to lock in place at predetermined positions. Therefore these positions are configured to provide for customizable usage of a workstation in that there is a specific position for a tablet arm or other component(s) of a workstation for a desired mode of operability.

Returning to FIGS. 2 and 3, the second multifunction workstation 38 is pivotally mounted to the right portion 18C of the instrument panel 18. The second multifunction workstation 38 includes a flat portion 88, a tray area 90, and an opening area 92. The flat portion 88 is operable to be used, for example, as a writing space or a location for placing an object upon. The tray area 90 includes a recess 94 to operate as a storage space to retain objects that fit at least partially within the recess 94 (for example, a cell phone, a pen, or other object needed for access by a user). The opening area 92 is an opening that extends through the second multifunction workstation 38. The opening area 92 is operable to be used, for example, as a cup holder or as a retention feature for anything that fits at least partially inside the opening.

The second multifunction workstation 38 is moveable between the accessible position, shown in FIG. 3, and the stowed position shown in FIG. 2. When in the stowed position, the second multifunction workstation 38 is stowed within the instrument panel 18. When in the accessible position, second multifunction workstation 38 extends out from the instrument panel 18 and is accessible by a user seated in the seat 14. Another multifunction workstation 38' which has similar features, structure, and function as the second multifunction workstation 38 may be housed within the left portion 18B of the instrument panel 18.

The workstation storage element 40 is housed within the instrument panel 18. The workstation storage element 40 is a storage area defined by the instrument panel 18 and has a cover 98 that may be opened for access to a storage area 40A. Examples of actuation of the cover 98 include a sliding or hinged component actuated by a button press or other suitable means. A workstation storage element 40' which has similar features, structure and functions as workstation storage 40 may be housed within the left portion 18B of the instrument panel 18.

It is to be understood that various types, shapes, and sizes of actuation mechanisms and other features of an individual component of workstation 22 may be implemented in other components of workstation 22 (e.g., the first multifunction workstation 36, the second multifunction workstation 38, or the workstation storage element 40). Additionally, various combinations of workstation components are contemplated for use in a vehicle, including any number of each of the components of workstation 22.

Figure 5:
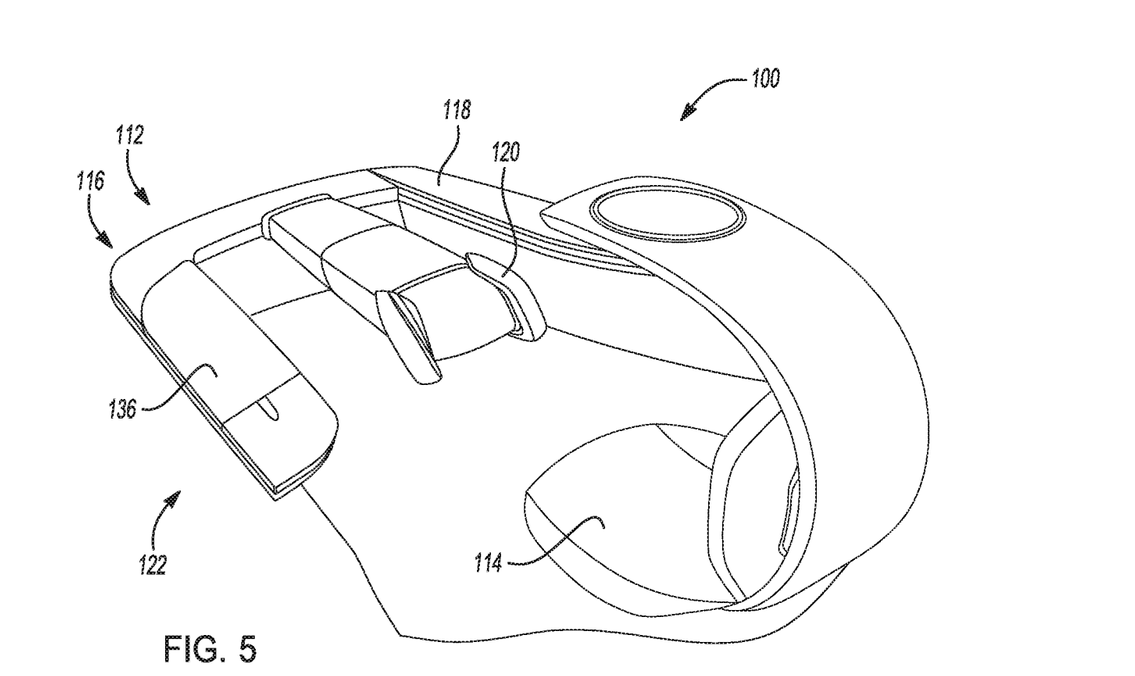
FIG. 5 is a perspective view of a vehicle interior including a vehicle seat and driving controls in a driving position according to an exemplary embodiment.
Figure 6:
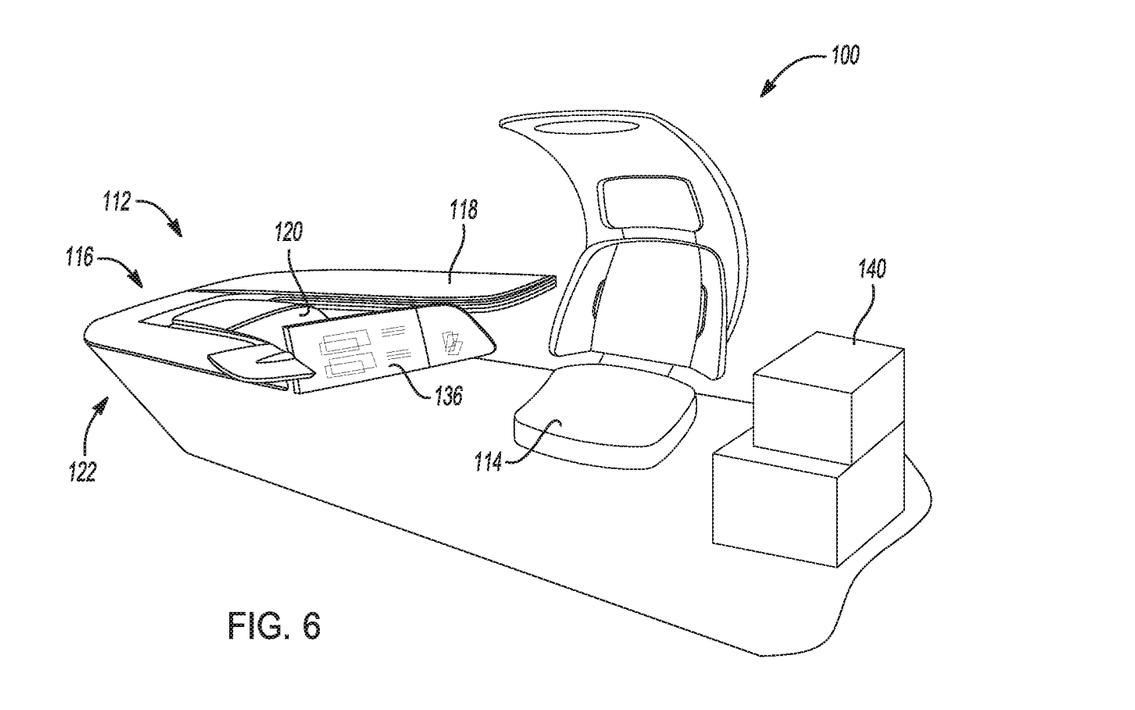
FIG. 6 is a perspective view of a vehicle interior including a vehicle seat facing a side of the vehicle, driving controls in a non-driving position, and a workstation in an accessible position according to an exemplary embodiment.

Turning now to FIGS. 5 and 6, a vehicle 100 is shown with an interior 112 including a seat 114, a multipurpose dashboard 116, an instrument panel 118, driving controls 120, and a workstation 122. The structure and function of the instrument panel 118 and the workstation 122 are substantially similar in nature to those described above with respect to the instrument panel 18 and the workstation 22.

The seat 114 operates to rotate about the vehicle from a primarily forward facing position to a primarily sideways facing position. As such, it can be seen that the seat 114 rotates at least through 90 degrees from a driving position to a non-driving position. Additionally, it should be noted that this 90 degree position may be favorable for users in vehicles in a non-driving mode (e.g., during park, at idle, or during an autonomous driving mode) in order to allow the user to focus on non-driving tasks within certain portions of the vehicle. One such non-driving task as indicated in FIG. 6, in particular, is related to the packages 140 that are located toward the rear of the vehicle with respect to the forward driving direction. For example, a user can be parked or driving autonomously while a user interacts with workstation 122, including as shown with a multifunction workstation 136 (similar in structure and function to the first multifunction workstation 36) to interact with the packages 140 to complete a shipping/delivery task, such as scanning a bar code on a package prior to delivery or upon pickup receipt within the vehicle 100.

Driving controls 120 have a telescoping feature. This telescoping feature is indicated by a first position of the driving controls 120 in FIG. 5 and a second position of the driving controls 120 in FIG. 6. FIG. 5 depicts driving controls 120 positioned in a driving position as extended for interaction with the user in the vehicle seat 114. The telescoping feature is indicated by the driving controls 120 in FIG. 6 in a retracted (stowed) position. The retracted position of driving controls 120 is facilitated by the driving controls 120 telescoping inward on itself to save space. As such, a configuration of vehicle 100 in a non-driving mode provides a functionality in that the driving controls 120 are not in the way of the workstation 122 including during active use of multifunction workstation control 136.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multipurpose dashboard for use in a vehicle, the multipurpose dashboard comprising:
   an instrument panel having a cross member, the instrument panel disposed within the vehicle;
   driving controls mounted to a housing slidably mounted on the cross member of the instrument panel in the lateral direction of the vehicle, the driving controls configurable into a driving position for a user driving mode and configurable into a non-driving position for a non-driving mode, the non-driving position being disposed away from the driving position in the longitudinal and lateral directions of the vehicle; and
   a workstation mounted to the instrument panel, the workstation configurable into an accessible position during the non-driving mode and configurable into a stowed position during the user driving mode.

2. The multipurpose dashboard of claim 1, wherein the vehicle is controlled by a user during the user driving mode and the vehicle is controlled by a vehicle control system during the non-driving mode.

3. The multipurpose dashboard of claim 2, wherein the driving controls are disposed directly in front of a vehicle seat and accessible by the user in the vehicle seat when in the driving position.

4. The multipurpose dashboard of claim 3, wherein the driving controls are not accessible by the user in the vehicle seat when in the non-driving position.

5. The multipurpose dashboard of claim 1, wherein the driving controls are centered on the instrument panel when in the driving position.

6. The multipurpose dashboard of claim 5, wherein the driving controls are disposed to a side of the instrument panel when in the non-driving position.

7. The multipurpose dashboard of claim 1, wherein the instrument panel includes a member, the driving controls are mounted to the member, and the driving controls are configured to translate along the member between the driving position and the non-driving position.

8. The multipurpose dashboard of claim 1, wherein the driving controls include a steering member, an accelerator pedal, and a brake pedal.

9. The multipurpose dashboard of claim 1, wherein the workstation is stored in a space located above a wheel arch area of the vehicle when in the stowed position.

10. The multipurpose dashboard of claim 1, wherein the workstation is accessible to a user in a vehicle seat when in the accessible position.

11. The multipurpose dashboard of claim 1, wherein the workstation is rotatable and translatable from one configuration to another configuration when in the accessible position.

12. The multipurpose dashboard of claim 1, wherein the workstation is housed within the instrument panel when in the stowed position.

13. The multipurpose dashboard of claim 1, wherein the workstation includes an articulating arm operable to pivot from the stowed position into the accessible position.

14. The multipurpose dashboard of claim 13, wherein the articulating arm is connected to a pivot assembly that includes a ball detent spring mechanism to provide preset detent positions of the articulating arm.

15. The multipurpose dashboard of claim 13, wherein the articulating arm includes a front surface having an electronic user interface and a back surface, the front and back surfaces opposite one another, the articulating arm rotatable for access to the front surface and the back surface.

16. The multipurpose dashboard of claim 1, wherein the workstation includes a work surface extending from the instrument panel when in the accessible position and stored within the instrument panel when in the stowed position.

17. The multipurpose dashboard of claim 1, wherein the instrument panel at least partially surrounds a vehicle seat in the vehicle.

18. A multipurpose dashboard for use in an autonomous vehicle, the multipurpose dashboard comprising:
   an instrument panel having a cross member, the instrument panel disposed within the autonomous vehicle;
   driving controls mounted to a housing slidably mounted on the cross member of the instrument panel in the lateral direction of the vehicle, the driving controls configurable into a driving position for a user driving mode and configurable into a non-driving position for an autonomous driving mode, the non-driving position being disposed away from the driving position in the longitudinal and lateral directions of the vehicle;
   wherein the driving controls are disposed directly in front of a vehicle seat and accessible by the user in the vehicle seat when in the driving position; and
   wherein the driving controls are not accessible by the user in the vehicle seat when in the non-driving position; and
   a workstation mounted to the instrument panel, the workstation configurable into an accessible position during the autonomous driving mode and configurable into a stowed position during the user driving mode, the workstation including a work surface extending from the instrument panel when in the accessible position, the work surface stored within the instrument panel when in the stowed position.

19. A multipurpose dashboard for use in an autonomous vehicle, the multipurpose dashboard comprising:
   an instrument panel having a cross member, the instrument panel being disposed within the autonomous vehicle, the instrument panel at least partially surrounding a vehicle seat in the autonomous vehicle;
   driving controls mounted to a housing slidably mounted on the cross member of the instrument panel in the lateral direction of the vehicle, the driving controls configurable into a driving position for a user driving mode and configurable into a non-driving position for an autonomous driving mode, the non-driving position being disposed away from the driving position in the longitudinal and lateral directions of the vehicle; and
   a workstation mounted to the instrument panel, the workstation configurable into an accessible position during the autonomous driving mode and configurable into a stowed position housed within the instrument panel during the user driving mode, the workstation being rotatable and translatable from one configuration to another configuration and including a work surface extending from the instrument panel when in the accessible position, the work surface stored within the instrument panel in a space located above a wheel arch area of the autonomous vehicle when in the stowed position, the workstation further including an articulating arm operable to pivot from the stowed position into the accessible position, the articulating arm connected to a pivot assembly that includes a ball detent spring mechanism to provide preset detent positions of the articulating arm, the articulating arm including a front surface having an electronic user interface and a back surface, the front and back surfaces opposite one another, the articulating arm rotatable for access to the front surface and the back surface.

* * * * *